2 Sheets--Sheet 2.

L. HEINS.
Treadles.

No. 143,902. Patented Oct. 21, 1873.

WITNESSES:
P. C. Dieterich
F. Riese

INVENTOR.
Leopold Heins per C. H. Watson
ATTORNEYS.

AM. PHOTO-LITHOGRAPHIC Co. N.Y. (OSBORNE'S PROCESS)

UNITED STATES PATENT OFFICE.

LEOPOLD HEINS, OF BRUNSWICK, GEORGIA.

IMPROVEMENT IN TREADLES.

Specification forming part of Letters Patent No. 143,902, dated October 21, 1873; application filed October 10, 1873.

*To all whom it may concern:*

Be it known that I, LEOPOLD HEINS, of Brunswick, in the county of Glynn and State of Georgia, have invented certain new and useful Improvements in Sewing-Machine Power; and I do hereby declare that the following is a full, clear, and exact description thereof, reference being had to the accompanying drawings, and to the letters of reference marked thereon, which form a part of this specification.

The nature of my invention consists in the construction and arrangement of a treadle mechanism for operating sewing-machines or other light machinery, as will be hereinafter more fully set forth.

In order to enable others skilled in the art to which my invention appertains to make and use the same, I will now proceed to describe its construction and operation, referring to the annexed drawings, in which—

Figure 1:
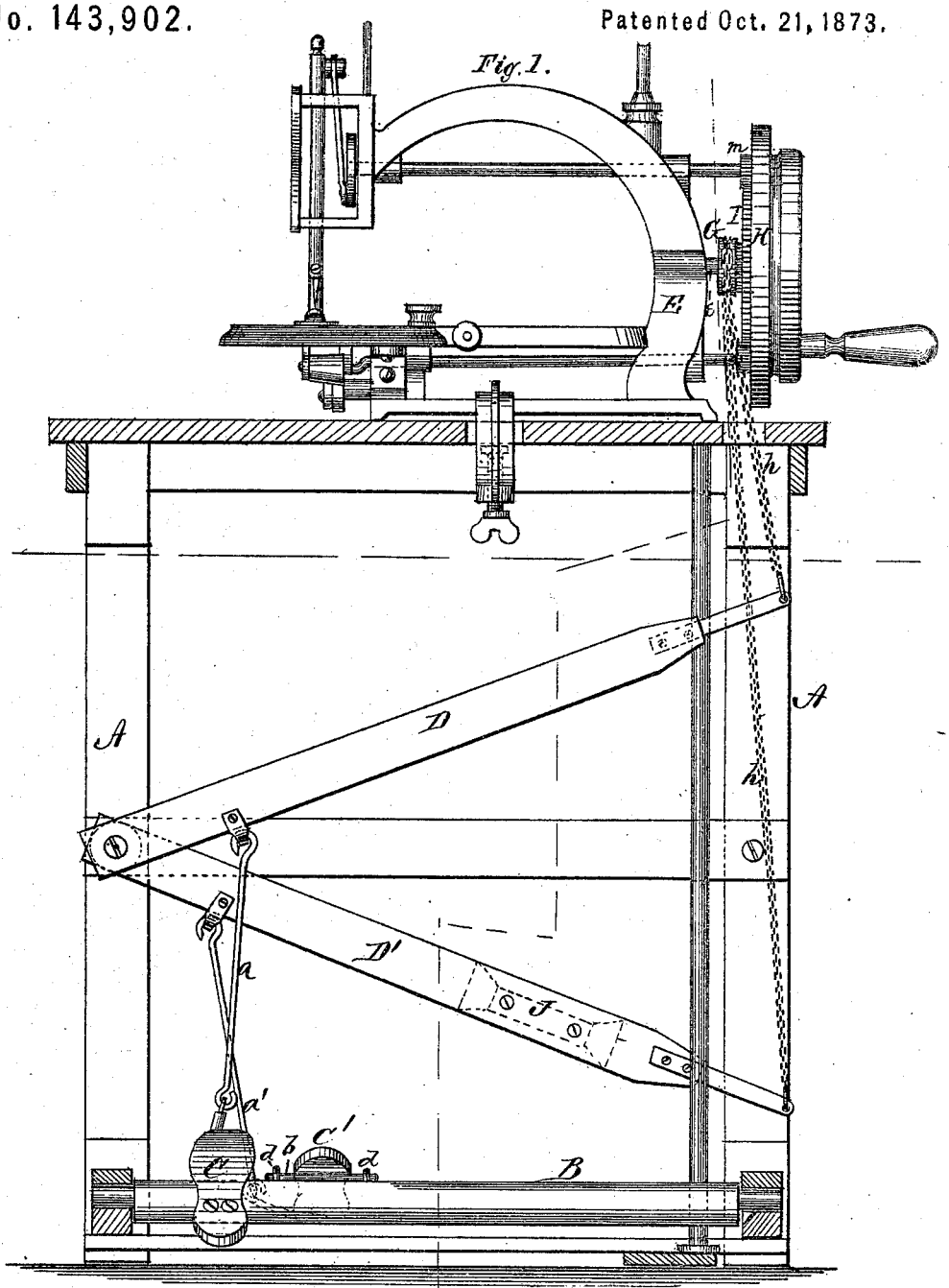
Figure 2:
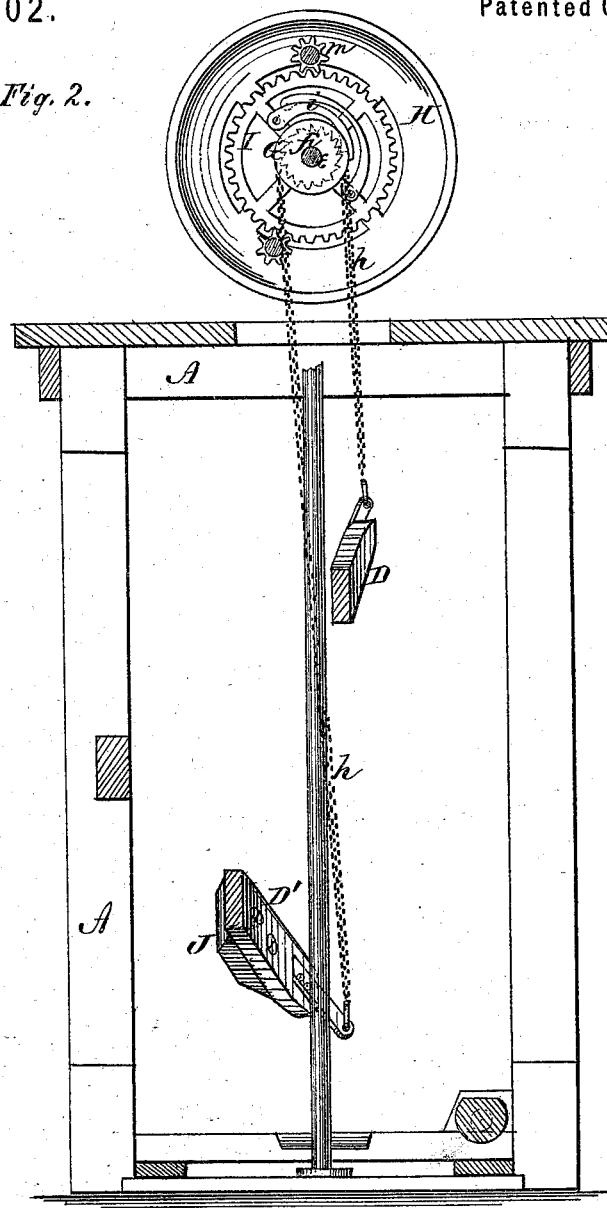
Figure 4:
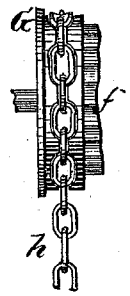
Figure 3:
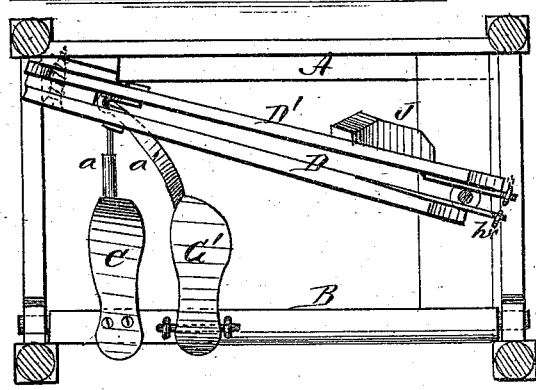

Figure 1 is a front elevation of a sewing-machine embodying my invention. Fig. 2 is a transverse section of the same through the line $x$ $x$, Fig. 1. Fig. 3 is a horizontal section, showing the treadles and the levers connected therewith; and Fig. 4 is an enlarged view of the chain-wheel.

A represents a sewing-machine stand, in the lower part of which is a rocking shaft, B. On this shaft is firmly secured a treadle, C, which, by a rod, $a$, is connected with a lever, D, pivoted at one end to the stand A. Another treadle, C', is provided with journals $b$, and pivoted in ears $d$ $d$ on the rock-shaft B. This treadle is, by a rod, $a'$, connected with a lever, D', which is also pivoted at one end to the stand A. $h$ represents a chain, the ends of which are attached to the ends of the levers D and D', and which passes over a wheel or pulley, G, mounted upon a shaft, $e$, projecting from the frame E of the sewing-machine on top of the stand. The wheel or pulley G is made, on its circumference, with suitable recesses for the links of the chain to drop into, or with teeth to enter or grasp the links of the chain, and thus insure the turning of said wheel by the chain. On the outer side of the wheel G is formed or attached a ratchet-wheel, $f$, into which works a spring-pawl, $i$, attached to the side of a cog-wheel, I. This cog-wheel is attached to the side of a fly-wheel, H, and both placed upon the shaft $e$, the cog-wheel gearing with a pinion, $m$, upon the end of the shaft which operates the needle-bar of the machine. The lever D' is, at or near its outer end, provided with a weight, J.

The operation of this treadle mechanism is as follows: The lever D being down, and the weighted lever D' up, the treadle C will be down, and the treadle C' up, ready to be forced down. The right foot is placed on the treadle C' and the left on C. After starting the fly-wheel by a slight touch of the hand, the lever D' will, with very little assistance of the right foot upon the treadle C', descend, and the chain $h$, by this motion, turn the wheel G, which, by means of the ratchet-wheel $f$, pawl $i$, and cog-wheel I, operates the machine, until the lever D' has gone as far down as it can go, and drawn up the lever D, the treadles C and C' also changing positions. The machine then stops, when, by pressing down the left foot, the treadle C will reverse the positions of the levers, or, in other words, wind up the weight, the pawl and ratchet allowing this to be done without any motion of the machine.

The machine can then be run again as before, this treadle mechanism thus producing a sort of intermittent motion. But it will be noticed that the machine makes a number of revolutions for each motion of the treadle. In fact, the machine will sew from seventy to eighty stitches for each time the treadle is moved, whereas with the usual treadle a machine will only make five or six stitches.

No effort is required to run the machine, the weighted lever doing it almost alone, or at least with only very slight assistance; and the machine can be stopped instantaneously by pressure of the left foot upon the treadle C.

Machines running by a band or belt may be arranged in the same manner, the band-wheel then taking the place of the present cog-wheel.

Any light machinery to be operated by a treadle may have this mechanism applied to it.

Having thus fully described my invention, what I claim as new, and desire to secure by Letters Patent, is—

1. The combination of the treadles C C', pivoted levers D D', weight J, chain h, and wheel or pulley G, all substantially as and for the purposes herein set forth.

2. The combination with the wheel G, operated by the chain h and levers D D', as described, of the ratchet-wheel f, pawl i, and cog-wheel I or its equivalent, substantially as and for the purposes herein set forth.

In testimony that I claim the foregoing as my own I affix my signature in presence of two witnesses.

LEOPOLD HEINS.

Witnesses:
 FRED. KEESECKER,
 P. C. DIETERICH.